Oct. 29, 1929.  J. LAUGHLIN  1,733,889
CONTAINER
Filed Oct. 24, 1928
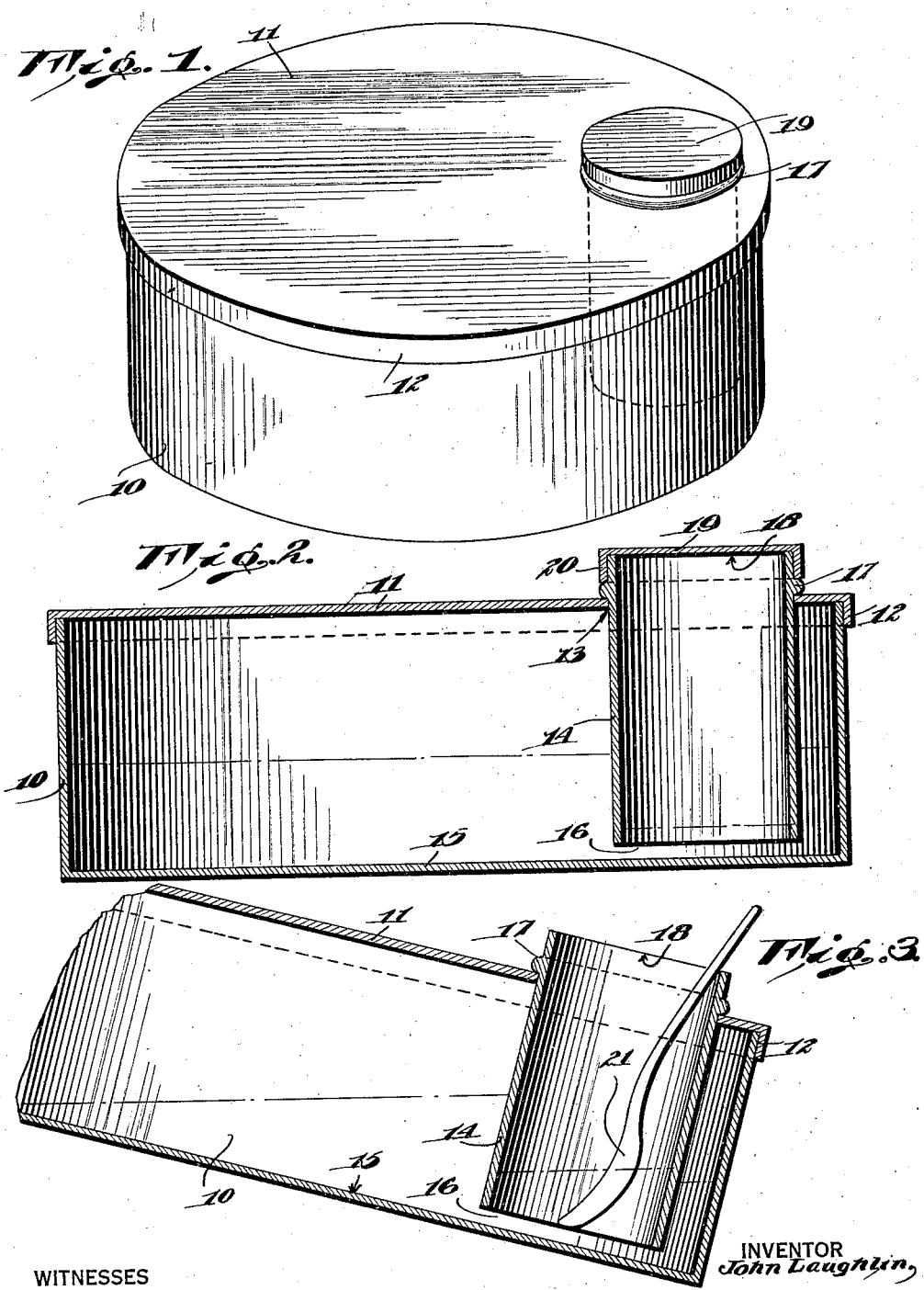
INVENTOR
John Laughlin,
BY
ATTORNEY
WITNESSES Patented Oct. 29, 1929

1,733,889

UNITED STATES PATENT OFFICE

JOHN LAUGHLIN, OF PHILADELPHIA, PENNSYLVANIA, ASSIGNOR OF ONE-FOURTH TO WALTER ECHART, OF PHILADELPHIA, PENNSYLVANIA

CONTAINER

Application filed October 24, 1928. Serial No. 314,734.

This invention relates to a container.

An object of the invention is the provision of a container having a restricted tubular member in open communication with the container through which material stored in the container may be removed while preventing too great a surface of the contents of the container being exposed to the atmosphere.

A further object of the invention is the provision of a container having a removable top which carries a restricted tube in communication with the container and through which the contents of the container is adapted to be removed to prevent too great a portion of the contents being exposed to the air, whereby the aroma of the contents will be dissipated.

This invention will be best understood from a consideration of the following detailed description, in view of the accompanying drawings forming a part of the specification.

In the drawings:

Figure 1 is a view in perspective of a container constructed in accordance with the principles of my invention, Figure 2 is a vertical section of the container, Figure 3 is a fragmentary vertical section of the container shown tilted for removing the contents of the container through a restricted passage.

Referring more particularly to the drawings, 10 designates a container which may be formed of any suitable material and which may be of any suitable shape. The container is provided with a top 11 having a flange 12 engaging over the upper open end of the container.

The top is provided with an opening 13 through which is inserted a tubular member 14 of such length that it will be spaced a suitable distance from the bottom 15 of the container, as indicated at 16. By this construction the tubular member 14 is in open communication with the container 10. The tubular member is provided with an annular rib 17 which is secured in any approved manner to the top 11 so that the tubular member forms with the top a unit. The outer open end 18 of the tubular member 14 is closed by a cap 19 having a flange 20 which embraces the upper edge of the tubular member and rests upon the rib 17.

The operation of my device is as follows: The cover 11 is removed and coffee or other suitable material is filled in the container after which the cover 11 is replaced with the tubular member 14 being forced downwardly through the material. When it is desired to remove any of the contents of the container 10 the cap 19 is removed and a suitable instrument, such as a spoon 21, is inserted through the upper open end 18 of the tubular member 14 and the contents withdrawn. In order to maintain a sufficient quantity of the contents of the container 10 within the tubular member 14 the container may be tilted at an angle to the horizontal, as shown in Figure 3.

I claim:

1. A device of the character described comprising a container having an open end, a cover for said end, the cover being provided with a restricted opening, a tube received within the cover and terminating short of the bottom of the container, and a cap forming a closure for the projecting end of the tube, said tube being located adjacent the periphery of the cover.

2. A device of the character described comprising a container having an open end, a cover for said end, the cover being provided with a restricted opening, a tube received within the cover and terminating short of the bottom of the container, and a cap forming a closure for the projecting end of the tube, the tubular member being secured to the cover of the container and forming a removable unit therewith, said tube being located adjacent the periphery of the cover.

JOHN LAUGHLIN.